United States Patent Office 3,083,040
Patented Mar. 26, 1963

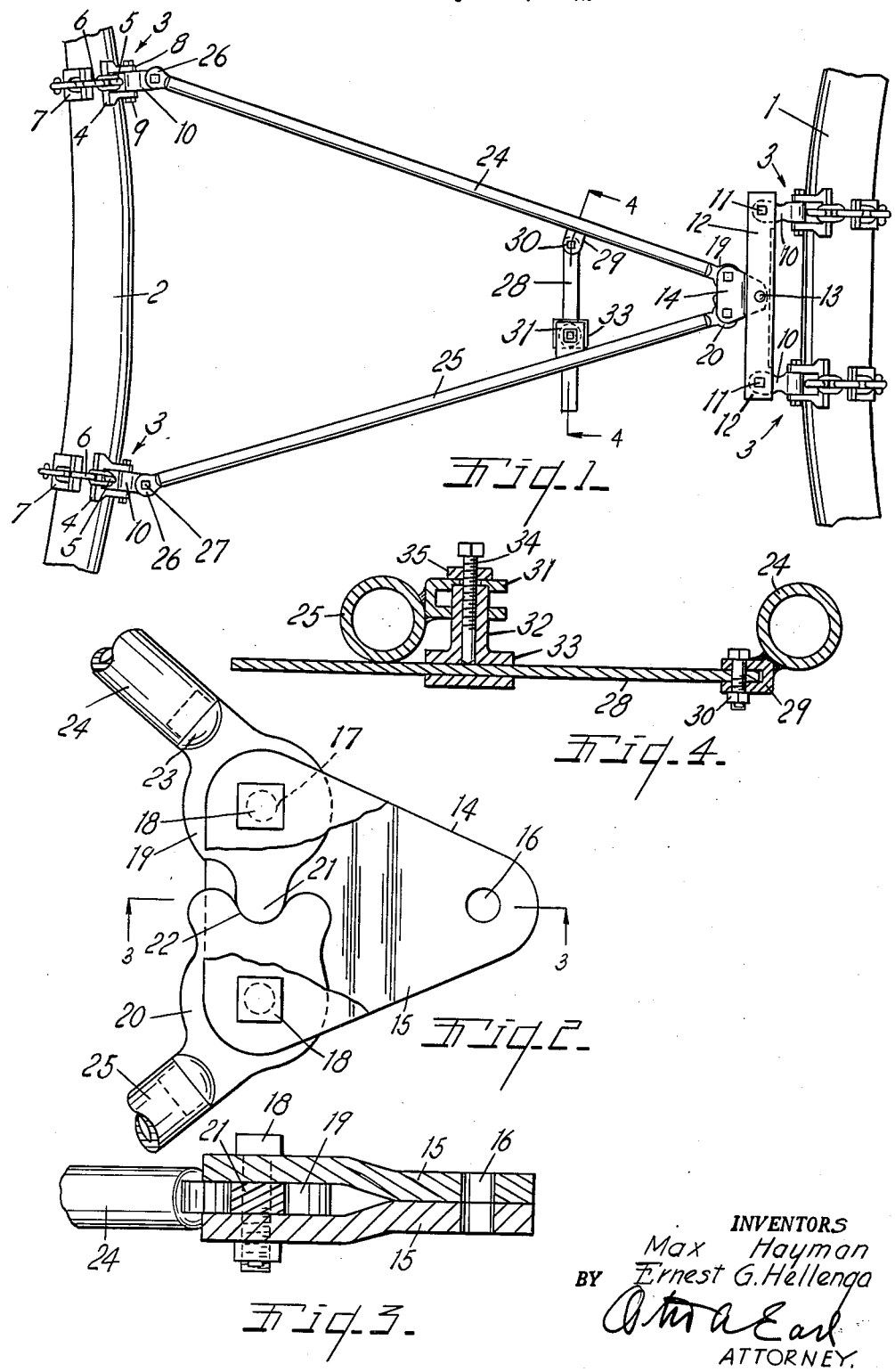

3,083,040
AUTOMOBILE TOW BAR
Max Hayman, Battle Creek, and Ernest G. Hellenga, Three Oaks, Mich., assignors to Pilot Distributing Company, Battle Creek, Mich.
Filed Apr. 9, 1962, Ser. No. 185,918
7 Claims. (Cl. 280—493)

This invention relates to improvements in automobile tow bars. The principal objects of this invention are:

First, to provide an improved form of automobile tow bar in which divergent towing arms are automatically and adjustably held at equiangularly spaced positions on opposite sides of a longitudinal plane through a draft pin so that the spaced rear ends can be separately connected to a towed vehicle symmetrically with respect to the line of towing.

Second, to provide a tow bar with divergent towing arms that are mechanically connected for equiangular swinging adjustment at their forward ends and adjustably braced in their adjusted positions by a single cross bar.

Third, to provide an automobile tow bar which is extremely rigid, but which is relatively light and transmits towing force to spaced points on the towed vehicle.

Other objects and advantages of the invention will be apparent from a consideration of the following description and claims. The drawings, of which there is one sheet, illustrate a highly practical form of the invention.

FIG. 1 is a top plan view of the tow bar of the invention operatively connected between the bumpers of a towing and towed vehicle, the bumpers being fragmentarily illustrated.

FIG. 2 is an enlarged fragmentary top plan view partially broken away illustrating the connection between the divergent arms of the tow bar.

FIG. 3 is a fragmentary cross sectional view taken along the plane of the line 3—3 in FIG. 2.

FIG. 4 is a cross sectional view taken along the plane of the line 4—4 in FIG. 1.

The tow bar of the invention is of the type which is easily attached to the bumpers of automobiles to tow one automobile with another. 1 indicates the rear bumper of a towing vehicle and 2 indicates the front bumper of a towed vehicle. Four coupling heads 3 are used to connect the tow bar to the bumpers. The coupling heads are old elements and so are not disclosed in great detail. Generally they include a rigid cast body 4 having a hook on the underside (not illustrated) engageable under the lower edge of the bumper with the body lapped against the face of the bumper. Adjustable clamp screws 5 anchored in the bodies are connected to chains 6 which extend upwardly across the top of the bumper and selectively engage S-shaped hooks 7 hooked over the top edge of the bumper. Spaced belts 8 project from the body 4 and receive horizontal pivot bolts 9 for securing draw blocks 10 to each coupling head.

At the further end of the tow bar of the invention the draw blocks 10 are pivotally connected by bolts 11 with the ends of a cross bar 12 of rearwardly opening channel shaped cross section. A draft pin or bolt 13 is passed through the center of the cross bar to swivelly connect the tow bar of the invention to the cross bar.

The tow bar consists of a front towing yoke 14 of generally triangular outline having spaced upper and lower plates 15 joined together at their forward ends and forming a hole 16 which receives the draft pin 13. At their wider rear ends the plates 14 define spaced holes 17 receiving pivot pin bolts 18. Positioned around the bolts 18 and between the plates 15 are a pair of coacting cam plates 19 and 20. The plate 19 has a projecting nose 21 formed thereon which is rollingly engaged with a notch 22 formed in the side of the cam plate 20. Angular motion of one cam plate is thus imparted to the other in equal and opposite direction.

At their rear sides the cam plates 19 and 20 are provided with integral enlargements 23 of cylindrical shape which are received in and fixedly secured to the forward ends of two tubular towing arms 24 and 25. At their divergent rear ends the arms 24 and 25 are provided with connecting yokes 26 pivotally secured by upright pivot bolts 27 to the draw blocks 10 of the rear coupling heads.

In order to facilitate attachment of the tow bar and the four coupling heads associated therewith to the bumpers in symmetrical relation an adjustable cross bar 28 is connected between the towing arms adjacent their forward convergent ends. The arm 24 has a simple yoke bracket 29 welded thereto and pivotally connected to the cross bar 28 by a pivot bolt 30. The other arm 25 has a yoke shaped bracket 31 secured thereto with a coupling tube 32 swivelly received in one branch of the yoke and abutted against the other. The lower end of the tube 32 has a transverse sleeve 33 of rectangular cross section secured thereto for slidingly receiving the cross bar 28. A clamp screw 34 threadedly engaged in the tube 32 adjustably clamps the cross bar in the sleeve. A lock nut 35 on the screw locks the tube and the screw to the bracket 31. By means of this adjustable connection and cross bar 28 the tubular towing arms may be adjusted to the desired degree of spread after which the coupling heads 3 and particularly those heads attached to the towed bumper 2 may be attached one at a time without the arms swinging relative to each other. The tubular towing arms are relatively light but effectively transmit towing force when attached to the bumpers and pressed as described. The cross bar 28 functions to resist the tendency of towing force to slide the rear coupling heads together.

What is claimed as new is:
1. A tow bar comprising,
a front towing yoke having spaced upper and lower plates joined together at the front and defining an upright draft pin hole in their joined portions,
laterally spaced pairs of pivot pin holes in the rear ends of said plates having pivot pins removeably positioned therein,
a pair of coacting cam plates rotatably mounted between said yoke plates and around said pivot pins,
a nose projecting from one of said cam plates,
a notch formed in the other of said cam plates receiving said nose with the edge of the notch rollingly engaging the edge of the nose,
connecting portions on said cam plates projecting from said yoke plates at equi-angularly spaced positions on opposite sides of a longitudinal plane passed between said pivot pins and through said draft pin hole,
a pair of tubular towing arms secured to said connecting portions of said cam plates,
a yoke secured to one of said arms and having a tie bar pivoted therein,
a second yoke secured to the other of said arms,
a coupling tube pivoted in one side of said second yoke and bearing against the other side transverse to said other arm and having a sleeve on one end slidably receiving said tie bar,
a clamp screw threadedly engaged through said coupling tube and clampingly engaged with said tie bar,
a lock nut on said screw engageable with said second yoke,
and coupling means on the rear ends of said arms attachable to a bumper.

2. A tow bar comprising,
a front towing yoke having spaced upper and lower plates joined together at the front and defining an upright draft pin hole in their jointed portions,
laterally spaced pairs of pivot pin holes in the rear ends of said plates having pivot pins positioned therein,
a pair of coacting cam plates rotatably mounted between said yoke plates and around said pivot pins,
a nose projecting from one of said cam plates,
a notch formed in the other of said cam plates receiving said nose with the edge of the notch rollingly engaging the edge of the nose,
connecting portions on said cam plates projecting from said yoke plates at equi-angularly spaced positions on opposite sides of a longitudinal plane passed between said pivot pins and through said draft pin hole,
a pair of towing arms secured to said connecting portions of said cam plates,
and coupling means on the rear ends of said arms attachable to a bumper.

3. A tow bar comprising,
a front towing yoke having spaced upper and lower plates joined together at the front and defining an upright draft pin hole in their joined portions,
laterally spaced pairs of pivot pin holes in the rear ends of said plates having pivot pins positioned therein,
a pair of coacting cam plates rotatably mounted between said yoke plates and around said pivot pins,
a nose projecting from one of said cam plates,
a notch formed in the other of said cam plates receiving said nose with the edge of the notch rollingly engaging the edge of the nose,
connecting portions on said cam plates projecting from said yoke plates at equi-angularly spaced positions on opposite sides of a longitudinal plane passed between said pivot pins and through said draft pin hole,
a pair of tubular towing arms secured to said connecting portions of said cam plates,
a tie bar pivoted to one of said arms,
a yoke bracket secured to the other of said arms,
a coupling tube pivoted in said bracket transverse to said other arm and having a sleeve on one end slidably receiving said tie bar,
a clamp screw threadedly engaged through said coupling tube and clampingly engaged with said tie bar,
a lock nut on said screw engageable with said yoke bracket,
and coupling means on the rear ends of said arms attachable to a bumper.

4. A tow bar comprising,
a front towing yoke having spaced upper and lower plates joined together at the front and defining an upright draft pin hole in their joined portions,
laterally spaced pairs of pivot pin holes in the rear ends of said plates having pivot pins positioned therein,
a pair of coacting cam plates rotatably mounted between said yoke plates and around said pivot pins,
a nose projecting from one of said cam plates,
a notch formed in the other of said cam plates receiving said nose with the edge of the notch rollingly engaging the edge of the nose,
connecting portions on said cam plates projecting from said yoke plates at equi-angularly spaced positions on opposite sides of a longitudinal plane passed between said pivot pins and through said draft pin hole,
a pair of towing arms secured to said connecting portions of said cam plates,
a tie bar pivotally connected to one of said arms and adjustably and swivelly connected to the other of said arms,
and coupling means on the rear ends of said arms attachable to a bumper.

5. A tow bar comprising,
a front towing yoke having spaced upper and lower plates joined together at the front end,
means for connecting said joined portions to a towing vehicle,
a pair of coacting cam plates mounted between the rear ends of said yoke plates,
pivots locating said cam plates relative to said yoke plates and in draft transmitting relation therebetween,
a nose projecting from one of said cam plates,
a notch formed in the other of said cam plates receiving said nose,
connecting portions on said cam plates projecting from said yoke plates at equiangularly spaced positions on opposite sides of a longitudinal plane passed between said pivots and through said connecting means at the front of said yoke plates,
a pair of towing arms secured to said connecting portions of said cam plates,
and coupling means on the rear ends of said arms attachable to a bumper.

6. A tow bar comprising,
a front towing yoke having spaced upper and lower plates joined together at the front end,
means for connecting said joined portions to a towing vehicle,
a pair of coacting cam plates mounted between the rear ends of said yoke plates,
pivots locating said cam plates relative to said yoke plates and in draft transmitting relation therebetween,
a nose projecting from one of said cam plates,
a notch formed in the other of said cam plates receiving said nose,
connecting portions on said cam plates projecting from said yoke plates on opposite sides of a longitudinal plane passed between said pivots and through said connecting means at the front of said yoke plates,
a pair of towing arms secured to said connecting portions of said cam plates,
and coupling means on the rear ends of said arms attachable to a bumper.

7. A tow bar comprising,
a front towing part adapted to be connected at its forward end to a towing vehicle,
a pair of coacting cam plates mounted on the rear end of said part,
pivots locating said cam plates relative to said part and in draft transmitting relation therewith,
a nose projecting from one of said cam plates,
a notch formed in the other of said cam plates receiving said nose,
connecting portions on said cam plates projecting from said part on opposite sides of a longitudinal plane passed between said pivots and through the front of said part adapted to be connected to the towing vehicle,
a pair of towing arms secured to said connecting portions of said cam plates,
and coupling means on the rear ends of said arms attachable to a bumper.

References Cited in the file of this patent

UNITED STATES PATENTS 2,120,422    Williams et al.            June 14, 1938
2,854,251    Able et al.               Sept. 30, 1958